(12) United States Patent
Icart

(10) Patent No.: US 8,666,066 B2
(45) Date of Patent: Mar. 4, 2014

(54) ENCODING POINTS OF AN ELLIPTIC CURVE

(75) Inventor: Thomas Icart, Paris (FR)

(73) Assignee: Morpho, Issy-les-Moulineaux (FR)

( * ) Notice: Subject to any disclaimer, the term of this patent is extended or adjusted under 35 U.S.C. 154(b) by 300 days.

(21) Appl. No.: 13/144,477

(22) PCT Filed: Jan. 8, 2010

(86) PCT No.: PCT/FR2010/050023
§ 371 (c)(1),
(2), (4) Date: Jul. 13, 2011

(87) PCT Pub. No.: WO2010/081980
PCT Pub. Date: Jul. 22, 2010

(65) Prior Publication Data
US 2011/0274269 A1    Nov. 10, 2011

(30) Foreign Application Priority Data

Jan. 14, 2009  (FR) ..................................... 09 50189

(51) Int. Cl.
*H04L 29/00*    (2006.01)
(52) U.S. Cl.
USPC .............................................. 380/28; 380/59
(58) Field of Classification Search
USPC .................................................. 380/28, 59
See application file for complete search history.

(56) References Cited

PUBLICATIONS

Barreto et al., "Fast hashing onto elliptic curves over fields of characteristic 3," http://eprint.iacr.org/2001/098.pdf, retrieved Aug. 12, 2009.

Boneh et al., "Short Signatures from the Weil Pairing," Journal of Cryptology, vol. 17, pp. 297-319, 2004.
Coron et al., "A Random Oracle into Elliptic Curves," http://eprint.iacr.org/2009/340.pdf, retrieved Aug. 17, 2009.
Icart, Thomas, "How to Hash into Elliptic Curves," http://eprint.iacr.org/2009/226.pdf, Aug. 17, 2009.
Padhye, Sahadeo, "A Public Key Cryptosystem Based on Singular Cubic Curve," http://eprint.iacr.org/2005/109.pdf, Aug. 14, 2009.
Page, D. et al., "A comparison of MNT curves and supersingular curves," Applicable Algebra in Engineering, Communication and Computing, Springer, vol. 17, No. 5, pp. 379-392, 2006.

(Continued)

*Primary Examiner* — Brandon Hoffman
*Assistant Examiner* — Michael D Anderson

(57) ABSTRACT

The method comprises, in an electronic component, carrying out a cryptographic calculation that includes the step of obtaining points P on an elliptic curve following the equation $Y^2+a_1XY+a_3Y=X^3+a_2X^2+a_4+X+a_6$ (1) where $a_1, a_2, a_3, a_4$ et $a_6$ are elements of a set A of elements; where A is a ring of modular integers Z/qZ where q is a positive integer resulting from a number I of different prime numbers strictly higher than 3, I being an integer higher than or equal to 2, where A is a finite body Fq with q the power of a prime integer; where X and Y are the coordinates of the points P and are elements of A. The method comprises determining a diameter (11), and obtaining the coordinates X and Y of a point P (13) by applying a function (12) to said parameter. The Euler function $\phi$ of A corresponds to the equation $\phi(A) \bmod 3=1$. The function is a reversible and deterministic function expressed by a rational fraction in $a_1, a_2, a_3, a_4$ and $a_6$ and in said parameter in A, and reaches at least a number $q/4^I$ of points P, with I being equal to 1 for a finite body Pq. The method further comprises using the point P in a cryptographic application for ciphering or hashing or signature or authentication or identification.

12 Claims, 1 Drawing Sheet

(56) References Cited

PUBLICATIONS

Barreto, Paulo S. L.M., "Tales from the Cryptographer #1: Why public elliptic curve parameters are public," http://www.larc.br/~pbarreto/tales1.html., Oct. 11, 2013.

Shoup, Victor, "A New Polynomial Factorization Algorithm and its Implementation," Journal of Symbolic Computation, vol. 20, Issue 4, pp. 363-397, 1995.

International Search Report for PCT/FR2010/050023, dated Jun. 2, 2010.

Written Opinion of the International Searching Authority for PCT/FR2010/050023, mailed Jun. 2, 2010.

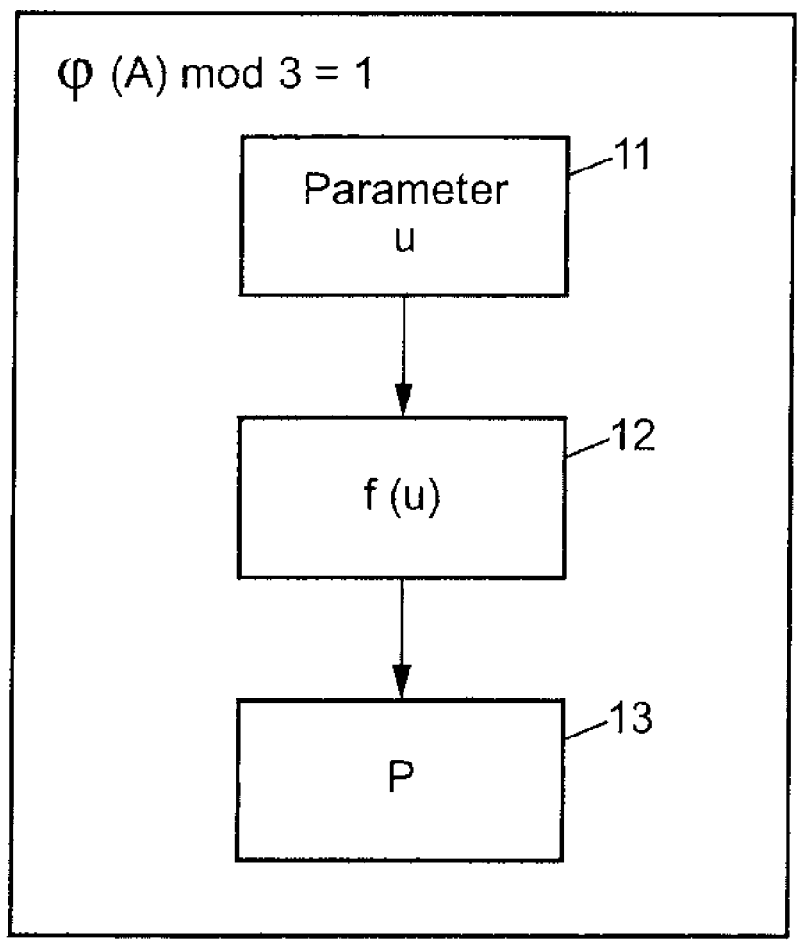

ENCODING POINTS OF AN ELLIPTIC CURVE

The present invention relates to message cryptography based on the use of points of an elliptic curve, and more particularly such cryptography in a deterministic manner.

In order to apply a cryptographic computation to a message, algorithms for inserting arbitrary values within mathematical structures are conventionally implemented. For this purpose, elliptic curves are mathematical structures which make it possible to facilitate the implementation of such cryptographic computations and to save memory space with respect to the implementation of other cryptographic computations.

However, efficient algorithms for inserting arbitrary values using elliptic curves are probabilistic. Consequently, the implementation time of such algorithms is not constant, it is dependent on the message to be coded. Thus, if an attacker determines various implementation times of the algorithm applied, he can obtain information about the coded message.

In order to mask the time used by a probabilistic insertion algorithm, provision may be made to add useless steps to this algorithm so that its application is always spread over a time period of identical length, whatever message is processed.

However, such processing is unwieldy and consumes a great deal of time.

The present invention is aimed at improving the situation.

A first aspect of the present invention proposes a method of executing a cryptographic computation in an electronic component comprising a step of obtaining points P on an elliptic curve satisfying the following equation:

$$Y^2 + a_1 XY + a_3 Y = X^3 + a_2 X^2 = a_4 + X + a_6 \quad (1)$$

where a1, a2, a3, a4 and a6 are elements of a set A of elements, where A is a ring of the modular integers Z/qZ where q is a positive integer product of a number I of different prime numbers that are strictly greater than 3, I being an integer greater than or equal to 2, or A is a finite field Fq with q a power of a prime integer;

where X and Y are the coordinates of the points P and are elements of A, said method comprising the following steps:

/a/ determining a parameter (11);

/b/ obtaining coordinates X and Y of a point P (13) by applying a function (12) to said parameter;

the Euler function φ of A satisfying the equation: φ(A) mod 3=1, the function being an invertible and deterministic function expressed by a rational fraction in a1, a2, a3, a4 and a6 and in said parameter within A, and attaining at least a number q/4I of points P, with I equal to 1 for a finite field Fq;

/c/ using said point P in a cryptographic encryption or hash or signature or authentication or identification application.

The wording 'attain at least a given number of points' is intended to mean the fact that the function considered is adapted for providing at output at least this given number of different points.

By virtue of these provisions, it is possible to carry out, in an electronic component, a cryptographic computation which is based on points of an elliptic curve, but without providing information to a potential attacker, and while maintaining a high level of implementational efficiency. Indeed, the function making it possible to obtain a point on the elliptic curve being a rational fraction, it is therefore a deterministic rather than a probabilistic function; the time taken to compute it is constant whatever the input parameter. Under these conditions, the obtaining of points on the elliptic curve is efficient and the computation time no longer depends on the message to be coded, in contradistinction to the prior art.

The ring A may be an RSA (for 'Rivest Shamir Adleman') ring. In this case, this ring can be written Z/qZ, with q equal to the product of two prime numbers, for which product φ(A) is difficult to compute.

It is noted that the Euler function φ over a ring A is the function which provides the number of invertible elements in this ring A. In the case where A is a finite field $F_q$, we have:

$$\phi(A) = (q-1)$$

By considering a ring of modular integers Z/qZ where q is a positive integer product of a number I of different prime numbers that are strictly greater than 3, I being an integer greater than or equal to 2, we have:

$$\phi(A) = lcm(p1-1, p2-1, \ldots, pI-1)$$

where 1 cm signifies least common multiple and the pi being the I prime numbers.

Given that a deterministic function according to one embodiment of the present invention is expressed in the form of rational fractions, their application always takes the same time whatever the message, or the datum, to which it is applied.

Indeed, in the set A, the functions for raising to the power 3 and ⅓ are bijective. Consequently, they can be written in the form of rational fractions and, therefore, the deterministic function f can be written in the form of rational fractions. In the set A, the computation of the power ⅓ is the same as the computation of the power (2φ(a)+1)/3. The latter is an integer since φ(A) mod 3=1. The following equation is satisfied in A: $x^{\phi(A)} = 1$ From this equation is deduced the following equation:

$$(x^3)^{(2\phi(A)+1)/3} = x^{3(2\phi(A)+1)/3} = x^{2\phi(A)+1} = x$$

Consequently, it is possible to write:

$$x^{(2\phi(A)+1)/3} = x^{1/3}$$

Now, the function f which makes it possible to obtain a point P of the elliptic curve comprises this raising to the power ⅓.

Thus, by virtue of the fact that the function for raising to the power ⅓ is computed in constant time whatever the element of A, it is possible to obtain points of the elliptic curve without having to handle probabilities. Consequently, the execution time for the cryptographic computation does not depend on the message on which this computation is performed, as is the case for the implementation of such a computation in a probabilistic manner such as performed in the prior art.

Moreover, in the context where A corresponds to the finite field $F_q$, the deterministic function f can provide at least q/4 points P of the elliptic curve. In the context where A corresponds to a ring of modular integers Z/qZ where q is a positive integer product of a number I of different prime numbers that are strictly greater than 3, I being an integer greater than or equal to 2, the deterministic function f can provide at least $q/4^I$ points P of the elliptic curve.

Such a number of points, obtained in this way in a deterministic manner, on the elliptic curve allows numerous cryptographic applications with a high level of security against potential attacks.

In one embodiment of the present invention, the elliptic curve used is a curve of Weierstrass type, or else termed a curve of characteristic p. Here, it is considered that q is different from $2^n$.

Equation (1) can be written:

$Y^2 = X^3 + aX + b$, with $a = a_2$ and $b = a_6$.

The deterministic function provides the coordinates of a point of the elliptic curve according to the following respective equations:

$$X = \left(v^2 - b - \frac{u^6}{27}\right)^{(2\varphi(A)+1)/3} + \frac{u^2}{3} \qquad (4)$$

and $$Y = ux + v \qquad (5)$$

where u is the parameter determined in step /a/, and
where $v = (3a - u4)/(6u)$

In another embodiment, the present invention is applied to the elliptic curves of characteristics 2.

In this case, q satisfies the equation:

$q = 2n$;

where n is an odd integer,
equation (1) may be written:

$Y2 + XY = X3 + aX2 + b$, with $a = a2$ and $b = a6$; and the deterministic function provides the coordinates of a point of the elliptic curve according to the following respective equations:

$X = (w^4 + w^3 + b)^{(2\phi(A)+1)/3} + w$ $Y = uX + w^2 \qquad (16)$ where u is the parameter determined in step /a/, and where $w = a + u2 + u$.

In an advantageous particular case, n is a prime odd integer. Indeed, such an n makes it possible to limit certain attacks.

In this context, the deterministic function can advantageously provide at least $2^{n-2}$ points P of the elliptic curve.

It is advantageously possible to apply this function to elliptic curves of Koblitz type, a particular case of the elliptic curves of characteristics 2 in which b is equal to 1 and a belongs to $F_2$. Indeed, by using Koblitz elliptic curves, it is possible to implement cryptographic computations in faster ways.

Provision may be made to apply this deterministic function to a result of a hash function. Thus, in step /a/, the parameter u may be obtained by applying a hash function h.

In one embodiment, the hash function is a one-way function. This property is preserved: the function arising from combining the deterministic function and the hash function exhibits this property of being one-way.

Here, a function over an elliptic curve which is one-way, like a hash function, is then ultimately obtained. This function is furthermore resistant to collisions.

Provision may also be made to apply this deterministic function in such a way that it exhibits the characteristic of not being differentiable (or the characteristic of being "indifferentiable") from a random function which would be applied to an elliptic curve. This characteristic exhibits advantages, especially when this function is applied in a cryptographic scheme which is proved as being secure in a model where the hash functions are assumed to be random. Indeed, as the deterministic function exhibits the characteristic of being non-differentiable from a random function, a secure cryptographic scheme is obtained by applying this function in this same type of cryptographic scheme.

In step /a/, the parameter u may be obtained by applying a first hash function h and a second hash function h'. The generator of a group of points of the elliptic curve is denoted G. The cryptographic computation can comprise the application of the following function:

$f(h) + h' \cdot G$ where f is the deterministic function, and
where G is a generator of a group of points of the elliptic curve.

This group of points of the elliptic curve can correspond to the points which are used by the cryptographic computation according to one embodiment of the present invention.

A second aspect of the present invention a method of authentication by at least one password implementing a method of executing a cryptographic computation according to the first aspect of the present invention, in which in step /a/ the parameter is determined as a function of the password, said password being included in the parameter, and in which an authentication step is performed on the basis of the point P.

A third aspect of the present invention proposes a method of encrypting a datum, said encryption being based on the Boneh-Franklin identity on an elliptic curve admitting a coupling operation;

where the identity is a numerical value identifying an entity,
said method comprising the following steps:
/a/ obtaining a point by applying to the identity a method of executing a cryptographic computation as claimed in claim 6;
/b/ obtaining an encrypted datum by combining said point, a random parameter and the datum.

Here, the term 'combine' is intended to mean the fact of applying a combination of the coupling, hash operations, an 'exclusive or' operation and a scalar multiplication.

A fourth aspect of the present invention proposes a method of executing a cryptographic computation in an electronic component comprising a step of obtaining points P on an elliptic curve satisfying the following equation:

$Y2 + a2XY + a3Y = X3 + a2 \times 2 + a4 \times X + a6 \qquad (1)$ where a1, a2, a3, a4 and a6 are elements of a set A of elements,
where A is a ring of the modular integers Z/qZ where q is a positive integer product of a number I of different prime numbers that are strictly greater than 3, I being an integer greater than or equal to 2, or A is a finite field Fq with q a power of a prime integer;
where X and Y are the coordinates of the points P and are elements of A,
said method comprising the following steps:
/a/ determining a point P with coordinates X and Y on the elliptic curve;
/b/ obtaining a parameter by applying a function to the point P;
the Euler function $\phi$ of A satisfying the equation: $\phi(A)$ mod $3 = 1$,
the function being the function inverse to a deterministic function expressed by a rational fraction in a1, a2, a3, a4 and a6 and in said parameter within A, and attaining at least a number q/4I of points P, with 1 equal to 1 for a finite field Fq;
/c/ using said parameter in a cryptographic encryption or hash or signature or authentication or identification application.

Here, it should be noted that the deterministic function such as stated in the first aspect of the present invention is an invertible function. It can therefore advantageously be used in the reverse direction, the inverse of the use which is made thereof in this first aspect of the present invention. Indeed, it may be useful in the cryptographic domain to start from points of the elliptic curve to obtain the parameter which corresponds to them via the function inverse to the function stated in the first aspect, especially for a data compression application.

Thus, a fifth aspect of the present invention proposes a method of data compression in which the data to be compressed correspond respectively to pairs of data X and Y corresponding to coordinates of points P of an elliptic curve satisfying the following equation:

$$Y2+a1XY+a3Y=X3+a2\times 2+a4+X+a6 \quad (1)$$

where a1, a2, a3, a4 and a6 are elements of a set A of elements, where A is a ring of the modular integers Z/qZ where q is a positive integer product of a number I of different prime numbers that are strictly greater than 3, I being an integer greater than or equal to 2, or A is a finite field Fq with q a power of a prime integer;

where X and Y are the coordinates of the points P and are elements of A, in which steps /a/ to /c/ of a method of executing a cryptographic computation according to the fourth aspect of the present invention are applied to each of said pairs of data, and in which said pairs of data are represented by the parameters respectively obtained in step /c/.

A sixth aspect of the present invention proposes an electronic device comprising means adapted for the implementation of a method of executing a cryptographic computation according to the first aspect of the present invention.

A seventh aspect of the present invention proposes an electronic device comprising means adapted for the implementation of a method of executing a cryptographic computation according to the fourth aspect of the present invention.

An eighth aspect of the present invention proposes a chip card comprising an electronic device according to the sixth or seventh aspect of the present invention.

Other aspects, aims and advantages of the invention will become apparent on reading the description of one of its embodiments.

The invention will also be better understood with the aid of FIG. 1 which illustrates the main steps of a cryptographic computation according to one embodiment of the present invention.

Any elliptic curve over A satisfies the following equation:

$$Y2+a1XY+a3Y=X3+a2\times 2+a4+X+a6 \quad (1)$$

where a1, a2, a3, a4 and a6 are elements of A,
where X and Y are elements of the set A.
If the following equation is satisfied:

$$\phi(A)=1 \bmod 3 \quad (2)$$

with $\phi$ the Euler function applied to A, then the function for raising to the power 3 and the function for raising to the power ⅓ are functions that can be computed efficiently in constant time whatever the values on which they are computed. This characteristic makes it possible to obtain in a determined manner a point P of the elliptic curve as a function of a parameter, the computation time being independent of the parameter to which this deterministic function f is applied.

This function f is subsequently also denoted $f_{a,b}$ or else $f_a$ depending on the type of equation of elliptic curves considered.

FIG. 1 illustrates, in a step 11, the determination of a parameter u, an element of the finite field $F_q$ considered. Next, the deterministic function f is applied to this parameter in a step 12 so as, ultimately, to obtain a point P of the elliptic curve, in a deterministic manner. All these steps are performed in a ring A, satisfying equation (2).

The following sections present the application of these characteristics in particular cases of elliptic curve equations. An embodiment of the present invention may be applied to the elliptic curves of Weierstrass type, that is to say having characteristic p with p>3, and to the elliptic curves having characteristics 2.

In the following sections, the elliptic curve considered is of Weierstrass type over a field $F_q$.

In this context, the cardinal q of the finite Galois field considered is equal to $p^n$, for p a prime number different from the values 2 and 3. Equation (1) can be written according to the following Weierstrass equation:

$$Y2=\times 3+aX+b \quad (3)$$

where a and b are parameters of the elliptic curve denoted Ea,b.

In the finite field A=Fq comprising a number q of elements, where q satisfies equation (2), the function f for raising to the power 3 and the function for raising to the power ⅓ are bijections that can be computed efficiently in constant time whatever the values on which they are computed.

Under these conditions, the coordinates X and Y of a point P of the elliptic curve satisfy the following respective equations:

$$X = \left(v^2 - b - \frac{u^6}{27}\right)^{(2\phi(A)+1)/3} + \frac{u^2}{3} \quad (4)$$

and $$Y = ux + v \quad (5)$$

where $$v = (3a - u4)/(6u) \quad (6)$$

where u is a parameter according to an embodiment of the present invention, u belonging to the finite field Fq*.

It is noted that, in the finite field $F_q$, raising to the power $((2\phi(A)+1)/3)$ corresponds to raising to the power ⅓.

Thus, in the case where the elliptic curve used for the implementation of a cryptographic computation is of Weierstrass type, it is advantageously possible to obtain points P of the elliptic curve as a function of the parameter u, according to equations (4) and (5), in a deterministic manner with constant computation time with respect to the parameter u.

Indeed, a point P having coordinates satisfying equations (4) and (5) corresponds to a unique point of the elliptic curve according to equation (3) since the intersection of the straight line according to equation (5) with the elliptic curve considered (3) satisfies the following system of equations:

$$Y^2=X^3+aX+b \quad (7)$$

and $$Y=uX+v \quad (5)$$

This equation system can be written as follows:

$$X^3-u^2X^2+(a-2uv)X+b-v^2=0 \quad (8)$$

and $$Y=uX+v \quad (6)$$

The latter equations can be further simplified as follows:

$$X^3 - u^2 X^2 + \left(\frac{u^4}{3}\right) X + b - v^2 = 0 \quad (9)$$

and $$Y = uX + v \quad (6)$$

Thus, this system of equations can finally be written:

$$\left(X - \frac{u^2}{3}\right)^3 + b - v^2 + \frac{u^6}{27} = 0 \quad (10)$$

and $$Y = uX + v \quad (6)$$

Equation (10) corresponding to equation (4), it is deduced therefrom that P is a point of the elliptic curve considered.

Consequently, a point P whose coordinates X and Y satisfy equations (4) and (5) is a point of the elliptic curve according to equation (3).

Hereinafter, we denote by:

fa,b the function which maps an element of Fq* to a point of the elliptic curve (3);

0 may not be an input of fa,b else a division by 0 would occur. Nonetheless, since the neutral element of the group of points of the elliptic curve may not be obtained by fa,b, we define 0 under fa,b to correspond to the neutral element of the point group.

The function $f_{a,b}$ is a deterministic function when the function for raising to the power 3, or else raising to the power ⅓, is a bijective function in the finite Galois field considered. It may be noted that the cost of applying such a function $f_{a,b}$ under these conditions corresponds approximately to an elevation to a power in this finite field $F_q$.

In order to decode a message which has been coded according to a computation executed in an embodiment of the present invention, provision is made to determine one or more parameter values u that made it possible to obtain a given point P of the elliptic curve.

For this purpose, the following sections indicate how to compute the function inverse to the function $f_{a,b}$.

Let $u_1$ and $u_2$ be two elements of $F_q^*$, each being a solution of the following equation:

$$u4 = 6u2x + 6uy - 3a = 0 \quad (11)$$

where a, x and y are elements of Fq.

Let b satisfy the following equation:

$$b = y2 - x3 - ax$$

Under these conditions, the following equation is then satisfied:

$$f_{a,b}(u_1) = (x_1, y_1) = f_{a,b}(u_2) = (x_2, y_2) = f_{a,b}(u) = (x, y) \quad (12)$$

Indeed, firstly, all three of the points P1 with coordinates (x1, y1), P2 with coordinates (x2, y2) and P with coordinates (x,y) are points of the elliptic curve Ea,b.

Moreover, according to equation (11), the points P and $P_1$ are situated on a straight line with the following equation:

$$Y = u_1 X + \frac{3a - u_1^4}{6u_1} \quad (13)$$

Now, as demonstrated hereinabove, since q satisfies equation (2), the elliptic curve (3) and the straight line (13) hereinabove cut one another at a single point. Thus, the points P and $P_1$ correspond to a single unique point.

By applying the same reasoning to the points P and $P_2$, it is likewise deduced therefrom that P and $P_2$ correspond to a single point also. Consequently, P, $P_1$ and $P_2$ correspond to the same point of the elliptic curve.

Thus, there exists a parameter u such that:

$$f_{a,b}(u) = (x, y)$$

if and only if the parameter u is a solution of equation (11).

Thus, solving equation (11) makes it possible to determine a parameter u as a function of which is obtained a point P of the elliptic curve according to the following equation:

$$f_{a,b}(u) = P$$

Equation (11) may be solved by standard algorithms such as Berlekamp's algorithm [Shoup, Journal of Symbolic Computation Vol 20:p363-397, 1995]. By virtue of this equation (11), it is therefore possible to easily invert the function fa,b so as to retrieve the parameter u corresponds to a point P of the elliptic curve.

This property also makes it possible to bound the number of points attained by fa,b. Let Im(fa,b) be the set of image points of the function fa,b. The image set Im(fa,b) has a cardinal smaller than q, since q is the cardinal of Fq. Moreover, equation (11) makes it possible to demonstrate that for each image point, there are a maximum of 4 antecedents. In fact, the cardinal of Fq is at most equal to 4 times the cardinal of Im(fa,b). The following inequality is therefore obtained:

$$q/4 \leq \#Im(fa,b) \leq q$$

It is also possible to give a heuristic result on the cardinal of $Im(f_{a,b})$. Equation (11) is an equation of degree 4 in the finite field $F_q$. In a finite field $F_q$, there is a probability of ⅖ that any arbitrary polynomial of degree 4 has no root. It is therefore possible to consider that ⅗ of the points of the elliptic curve are in the set of image points $Im(f_{a,b})$ and therefore that they may be used in the cryptographic computation according to an embodiment of the present invention.

In an embodiment of the present invention, it is possible to use elliptic curves over a ring Z/qZ where q is the product of I prime numbers $p_1 \ldots P_I$. The Chinese remainder theorem, a result of modular arithmetic dealing with solving systems of congruences, asserts that Z/qZ is isomorphic to $Z/p_1 Z x \ldots x Z/p_I Z$. Therefore, it is equivalent to study the elliptic curves over each of the $Z/p_i Z$. Now, since each $p_i$ is a prime number, $Z/p_i Z$ is in fact a field that may be denoted $F_{pi}$. Moreover, as each $p_i$ is strictly greater than 3, the equation of an elliptic curve over $F_{pi}$ is of Weierstrass type.

Thus equations (4) and (5) being demonstrated for each of the $F_{pi}$, they are also true for $F_{p1} x \ldots x F_{pI} = Z/qZ$.

Moreover, for each of the $F_{pi}$, we have $$pi/4 \leq \#Im(fa,b) \leq pi$$

This therefore makes it possible to prove that, over Z/qZ, we have $$p_1/4 x \ldots x p_I/4 = q/4^I \leq \#Im(f_{a,b}) \leq p_1 x \ldots x p_I = q$$

In an embodiment of the present invention, it is also possible to use elliptic curves of characteristics 2 which satisfy the following equation:

$$Y2+XY=X3+aX2+b \quad (15)$$

where a and b are elements of the finite Galois field $A=F2n$.

The number n may be an odd prime number so as to limit possible attacks.

Here we have:

$$2n \bmod 3 = 2$$

The function for raising to the power 3, and the function for raising to the power ⅓, is here also a bijection computable in constant time whatever the values to which it is applied on this finite Galois field.

We denote by u and w the parameters which are the elements of $F_{2^n}$ which satisfy the following equation:

$$w=a+u2+u$$

The points P with coordinates X and Y satisfying respectively the following equations are on the elliptic curve (15):

$$X=(w^4+w^3+b)^{(2\Phi(A)+1)/3}+w \quad (16)$$

$$Y=uX+w^2 \quad (16')$$

Thus, in the case where the elliptic curve used for the implementation of a cryptographic computation is of characteristic 2, it is advantageously possible to obtain points P of the elliptic curve as a function of the parameter u, according to equations (16) and (16'), in a deterministic manner.

Indeed, a point P having coordinates satisfying equations (16) and (16') corresponds to a unique point of the elliptic curve according to equation (15) since the intersection of the straight line according to equation (16') with the elliptic curve considered (15) satisfies the following system of equations:

$$Y2+XY=X3+aX2+b \quad (15)$$

and $$Y=uX+w2 \quad (16')$$

This equation system can be written as follows:

$$X3+(a+u+u2)X2+w2X+b+w4=0 \quad (17)$$

and $$Y=uX+w2 \quad (16')$$

The latter equations can be further simplified as follows:

$$X3+wX2+w2X+b+w4=0 \quad (18)$$

and $$Y=uX+w2 \quad (16')$$

Thus, this system of equations can ultimately be written:

$$(X+w)3+b+w3+w4=0 \quad (19)$$

and $$Y=uX+w2 \quad (16')$$

Equation (19) corresponding to equation (16), it is deduced therefrom that P is a point of the elliptic curve considered.

Consequently, a point P whose coordinates X and Y satisfy equations (16) and (16') is a point of the elliptic curve according to equation (15).

As in the case of elliptic curves of Weierstrass type, here also it is possible to bound the number of points included in the image $Im(f_a)$ of $f_a$. This set $Im(f_a)$ comprises at most $2^n$ elements since this is the number of elements of the starting set $F_{2^n}$.

Equation (16') can be written:

$$0=Y+a+uX+u2+u4 \quad (17)$$

For a value of u which solves the above equation, we have:

$$fa(u)=(x,y)$$

Equation (17) is of degree 4. Consequently, at least 4 different values of the parameter u solve this equation. Thus, there are at least $2^n/4=2^{n-2}$ image points of $f_a$. There are therefore at least $2^{n-2}$ elements in the set of image points $Im(f_a)$.

By virtue of the characteristics of the present invention, a deterministic function f is made available, denoted $f_{a,b}$ or $f_a$ according to the type of elliptic curves considered, whose image set is a set of points on an elliptic curve, the number of these points being high, since it is at the minimum equal to a quarter of the number q (cardinal of the finite field considered) in the case of elliptic curves of Weierstrass type, or at the minimum equal to $2^{n-2}$ in the case of elliptic curves of characteristics 2. This deterministic function f is based on the bijective characteristic of the function of the power 3 (and power ⅓) in the finite Galois field considered to which it is applied.

Hereinafter, a deterministic function such as this according to one embodiment of the present invention is used for the implementation of a hash function over an elliptic curve.

By applying a function $f_{a,b}$ according to one embodiment of the present invention to a string of bits resulting from a hash function h, a hash function is obtained as follows:

$$f_{a,b}(h) \quad (18)$$

This function (18) on an elliptic curve advantageously exhibits the following characteristics:

it is one-way when the hash function h is one-way; and
it is resistant to collisions.

Such a function finds application in numerous cryptographic computations.

In an embodiment of the present invention, provision may be made to combine a function $f_{a,b}$ according to one embodiment of the present invention with two hash functions to obtain a hash function over an elliptic curve which is not differentiable from a random function applied to an elliptic curve.

Consider two random hash functions h and h'. The hash function h is applied on the set $\{0,1\}^*$ toward A. The function h' is applied on the set $\{0,1\}^*$ toward the finite field $F_N$ where N is the order of the group of points of the curve that are used.

Under these conditions, the following function is a hash function over an elliptic curve which is not differentiable from a random function over an elliptic curve:

$$f_{a,b}(h)+h'\cdot G \quad (19)$$

A function $f_{a,b}$ according to one embodiment of the present invention is used to determine a point on the elliptic curve. G, a generating point of the group of points used, that is to say image points of $f_{a,b}$ in the context of the implementation of the present invention, is used to guarantee a uniform distribution of the points determined.

The present invention can advantageously be implemented in any type of cryptographic computation using elliptic curves. It can especially be advantageous within password-based authentication protocols, such as PACE (for 'Password Authenticated Connection Establishment'). In this case, it allows an improvement in performance through the use of a function (18), while not allowing any attack related to the execution time of the cryptographic computation.

The present invention can also be advantageously applied in the context of the protocols respecting privacy, such as those which are used for checking electronic identity documents, such as electronic passports.

Indeed, by listening to such protocols, it is possible to determine the parameters of the elliptic curves used, as is described in the document 'Why public elliptic curve parameters are publicly available at http://www.larc.usp.br/~pbarreto/tales1.html.

Now, these parameters make it possible to determine the nationality of the persons having these electronic documents.

By using the function (19), which may be applicable in a non-differentiable manner with a random function, it is possible to obtain a representation of the points which is independent of the public parameters of the elliptic curve.

In the context of identity-based encryption schemes, the present invention may also be advantageously applied. The Boneh-Franklin encryption scheme (Dan Boneh and Matthew K. Franklin, Proceedings of the Crypto 2001 conference) is an example of using such a construction. Indeed, to be able to be used under secure conditions, this scheme requires an elliptic curve over which a random function exists. The present invention provides a construction which, on the basis of a conventional random function, returns a random function over the elliptic curve. Nonetheless, the elliptic curves which are appropriate for an encryption according to Boneh-Franklin require a particular function: a points coupling function. A coupling function is a function ê which takes two points as input and returns a value over a finite field. This coupling is interesting since it has noteworthy mathematical properties. The following equation is satisfied:

$$ê(cG, dG) = g^{cd}$$

where g is a generator of the mapped finite field;
where c and d are the discrete logarithms of cG and dG to base G; and
where G is a generator of the group of points used.

The authors of the Boneh-Franklin scheme have proposed only a single type of elliptic curve for their scheme. The present invention makes it possible to increase the number of elliptic curves on which their encryption scheme may be implemented. Indeed, by virtue of the provisions of the present invention, this encryption scheme may be implemented on all curves where a coupling is efficiently computable and where equation (2) is satisfied.

In an embodiment of the present invention, it is advantageously possible to perform compression of coordinates of points. Indeed, the provisions of the present invention make it possible to represent the coordinates X and Y of a point P by a parameter u. Consequently, it is possible to use the parameter u to perform compression since u then represents a point P(X,Y) with half as much information.

The invention claimed is:

1. A method of executing a cryptographic computation in an electronic component comprising:
obtaining points P on an elliptic curve satisfying the following equation:

$$Y^2 + a_1 XY + a_3 Y = X^3 + a_2 X^2 + a_4 X + a_6 \quad (1)$$

where $a_1, a_2, a_3, a_4$ and $a_6$ are elements of a set A of elements,
where A is a ring of the modular integers Z/qZ where q is a positive integer product of a number I of different prime numbers that are strictly greater than 3, I being an integer greater than or equal to 2, or A is a finite field $F_q$ with q a power of a prime integer;
where X and Y are the coordinates of the points P and are elements of A,
said method further comprising:
/a/ determining a parameter;
/b/ obtaining coordinates X and Y of a point P by applying a function to said parameter;
the Euler function φ of A satisfying the equation: φ(A) mod 3=1,
the function being an invertible and deterministic function expressed by a rational fraction in $a_1, a_2, a_3, a_4$ and $a_6$ and in said parameter within A, and attaining at least a number $q/4^I$ of points P, with I equal to 1 for a finite field $F_q$;
/c/ using said point P in a cryptographic encryption or hash or signature or authentication or identification application.

2. The method of executing a computation as claimed in claim 1, in which A is different from $F_{2n}$, equation (1) being written:

$$Y^2 = X^3 + aX + b, \text{ and}$$

where $a = a_2$ and $b = a_6$;
in which the deterministic function provides the coordinates of a point of the elliptic curve according to the following respective equations:

$$X = \left(v^2 - b - \frac{u^6}{27}\right)^{(2\varphi(A)+1)/3} + \frac{u^2}{3} \quad (4)$$

and $$Y = ux + v \quad (5)$$

where u is the parameter determined in step /a/, and $$\text{where } v = (3a - u^4)/(6u) \quad (6).$$

3. The method of executing a computation as claimed in claim 1, in which q satisfies the equation:

$$q = 2^n;$$

where n is an odd integer,
equation (1) being written:

$$Y^2 + XY = X^3 + aX^2 + b$$

where $a = a_2$ and $b = a_s$;
in which the deterministic function provides the coordinates of a point of the elliptic curve according to the following respective equations:

$$X = (w^4 + w^3 + b)^{(2\varphi(A)+1)/3} + w \quad (16)$$

$$Y = uX + w^2$$

where u is the parameter determined in step /a/, and
where $w = a + u^2 + u$.

4. The method of executing a computation as claimed in claim 1, wherein said determining a parameter comprises obtaining the parameter by applying a hash function.

5. The method of executing a computation as claimed in claim 4, in which the hash function is one-way.

6. The method of executing a computation as claimed in claim 1, wherein said determining a parameter comprises obtaining the parameter by applying a first hash function h and a second hash function h', said cryptographic computation comprising the application of the following function:

$$f(h)+h'\cdot G$$

where f is the deterministic function, and
where G is a generator of a group of points of the elliptic curve.

7. A method of authentication by at least one password implementing a method of executing a cryptographic computation as claimed in claim 1, wherein said determining a parameter comprises determining the parameter as a function of the password, said password being included in the parameter, and further comprising performing an authentication on the basis of the point P.

8. A method of encrypting a datum, said encryption being based on the Boneh-Franklin identity on an elliptic curve admitting a coupling operation;
where the identity is a numerical value identifying an entity,
said method comprising:
/a/ obtaining a point by applying to the identity a method of executing a cryptographic computation;
/b/ obtaining an encrypted datum by combining said point, a random parameter and the datum;
wherein said obtaining a point by applying to the indentity a method of executing a cryptographic computation comprises obtaining said point on an elliptic curve satisfying the following equation:

$$Y^2+a_1XY+a_3Y=X^3+a_2X^2+a_4X+a_6 \quad (1)$$

where $a_1$, $a_2$, $a_3$, $a_4$ and $a_6$ are elements of a set A of elements,
where A is a ring of the modular integers Z/qZ where q is a positive integer product of a number I of different prime numbers that are strictly greater than 3, I being an integer greater than or equal to 2, or A is a finite field $F_q$ with q a power of a prime integer;
where X and Y are the coordinates of said point and are elements of A,
and wherein said obtaining a point by applying to the identity a method of executing a cryptographic computation further comprises:
obtaining said coordinates X and Y of said point by applying a function to said identity;
the Euler function φ of A satisfying the equation: φ(A) mod 3=1,
the function being an invertible and deterministic function expressed by a rational fraction in $a_1$, $a_2$, $a_3$, $a_4$ and $a_6$ and in said identity within A, and attaining at least a number $q/4^I$ of points, with I equal to 1 for a finite field $F_q$.

9. A method of executing a cryptographic computation in an electronic component comprising obtaining points P on an elliptic curve satisfying the following equation:

$$Y^2+a_1XY+a_3Y=X^3+a_2X^2+a_4X+a_6 \quad (1)$$

where $a_1$, $a_2$, $a_3$, $a_4$ and $a_6$ are elements of a set A of elements,
where A is a ring of the modular integers Z/qZ where q is a positive integer product of a number I of different prime numbers that are strictly greater than 3, I being an integer greater than or equal to 2, or A is a finite field $F_q$ with q a power of a prime integer;
where X and Y are the coordinates of the points P and are elements of A,
said method comprising:
/a/ determining a point P with coordinates X and Y on the elliptic curve;

/b/ obtaining a parameter by applying a function to the point P;
the Euler function φ of A satisfying the equation: φ(A) mod 3=1,
the function being the function inverse to an invertible and deterministic function expressed by a rational fraction in $a_1$, $a_2$, $a_3$, $a_4$ and $a_6$ and in said parameter within A, and attaining at least a number $q/4^I$ of points P, with I equal to 1 for a finite field $F_q$;
/c/ using said parameter in a cryptographic encryption or hash or signature or authentication or identification application.

10. A method of data compression in which the data to be compressed correspond respectively to pairs of data X and Y corresponding to coordinates of points P of an elliptic curve satisfying the following equation:

$$Y^2+a_1XY+a_3Y=X^3+a_2X^2+a_4X+a_6 \quad (1)$$

where $a_1$, $a_2$, $a_3$, $a_4$ and $a_6$ are elements of a set A of elements,
where A is a ring of the modular integers Z/qZ where q is a positive integer product of a number I of different prime numbers that are strictly greater than 3, I being an integer greater than or equal to 2, or A is a finite field $F_q$ with q a power of a prime integer;
where X and Y are the coordinates of the points P and are elements of A,
comprising, for each of said pairs of data:
determining a point P with coordinates X and Y corresponding to each of said pairs of data on the elliptic curve;
obtaining a parameter by applying a function to the point P;
the Euler function φ of A satisfying the equation: φ(A) mod 3=1,
the function being the function inverse to an invertible and deterministic function expressed by a rational fraction in $a_1$, $a_2$, $a_3$, $a_4$ and $a_6$ and in said parameter within A, and attaining at least a number $q/4^I$ of points P, with I equal to 1 for a finite field $F_q$;
in which said pairs of data are represented by the parameters respectively obtained.

11. An electronic device arranged to execute a cryptographic computation, where:
the electronic device is arranged to obtain points P on an elliptic curve satisfying the following equation:

$$Y^2+a_1XY+a_3Y=X^3+a_2X^2+a_4X+a_6 \quad (1)$$

where $a_1$ $a_2$, $a_3$, $a_4$ and $a_6$ are elements of a set A of elements,
where A is a ring of the modular integers Z/qZ where q is a positive integer product of a number of different prime numbers that are strictly greater than 3, I being an integer greater than or equal to 2, or A is a finite field $F_q$ with q a power of a prime integer;
where X and Y are the coordinates of the points P and are elements of A,
and wherein:
the electronic device is arranged to determine a parameter;
the electronic device is arranged to obtain coordinates X and Y of a point P by applying a function to said parameter;
the Euler function φ of A satisfying the equation: φ(A) mod 3=1,
the function being an invertible and deterministic function expressed by a rational fraction in $a_1$, $a_2$, $a_3$, $a_4$ and $a_6$ and in said parameter within A, and attaining at least a number $q/4^I$ of points P, with equal to 1 for a finite field $F_q$;

the electronic device is arranged to use said point P in a cryptographic encryption or hash or signature or authentication or identification application.

12. An electronic device arranged to execute a cryptographic computation, wherein:
the electronic device is arranged to obtain points P on an elliptic curve satisfying the following equation:

$$Y^2 + a_1 XY + a_3 Y = X^3 + a_2 X^3 + a_4 + X + a_6 \quad (1)$$

where $a_1$, $a_2$, $a_3$, $a_4$ and $a_6$ are elements of a set A of elements, where A is a ring of the modular integers $Z/qZ$ where q is a positive integer product of a number I of different prime numbers that are strictly greater than 3, I being an integer greater than or equal to 2, or A is a finite field $F_q$ with q a power of a prime integer;

where X and Y are the coordinates of the points P and are elements of A, and wherein:
the electronic device is arranged to determine a point P with coordinates X and Y on the elliptic curve;
the electronic device is arranged to obtain a parameter by applying a function to the point P;
the Euler function $\phi$ of A satisfying the equation: $\phi(A)$ mod $3=1$,
the function being the function inverse to an invertible and deterministic function expressed by a rational fraction in $a_1$, $a_2$, $a_3$, $a_4$ and $a_6$ and in said parameter within A, and attaining at least a number $q/4^I$ of points P, with I equal to 1 for a finite field $F_q$;
the electronic device is arranged to use said parameter in a cryptographic encryption or hash or signature or authentication or identification application.

* * * * *